(12) United States Patent
Taylor et al.

(10) Patent No.: US 6,376,968 B1
(45) Date of Patent: Apr. 23, 2002

(54) FIELD-INDUCED PIEZOELECTRICITY FOR ELECTRICAL POWER GENERATION

(75) Inventors: George W. Taylor, Princeton; Joseph R. Burns; Charles B. Carroll, both of Trenton, all of NJ (US); Eric Cross, University Park, PA (US)

(73) Assignee: Ocean Power Technologies, INC, Pennington, NJ (US)

( * ) Notice: Subject to any disclaimer, the term of this patent is extended or adjusted under 35 U.S.C. 154(b) by 0 days.

(21) Appl. No.: 09/074,744

(22) Filed: May 8, 1998

Related U.S. Application Data

(60) Provisional application No. 60/045,954, filed on May 8, 1997.

(51) Int. Cl.[7] .............................................. H01L 41/04
(52) U.S. Cl. ...................................... 310/339; 310/800
(58) Field of Search ................................. 310/339, 800

(56) References Cited

U.S. PATENT DOCUMENTS

| | | | | |
|---|---|---|---|---|
| 5,495,137 A | * | 2/1996 | Park et al. | 310/331 |
| 5,517,467 A | * | 5/1996 | Fromont et al. | 310/337 |
| 5,977,685 A | * | 11/1999 | Kurtia et al. | 310/311 |
| 6,194,815 B1 | * | 2/2001 | Carroll | 310/339 |
| 6,222,304 B1 | * | 4/2001 | Bernstein | 310/328 |
| 6,323,580 B1 | * | 11/2001 | Bernstein | 310/324 |

OTHER PUBLICATIONS

T. Furkawa and N. Seo, "Electrostriction as the origin of piezoelectricity in ferroelectric polymers," Japanese Journal of Applied Physics, vol. 29, No. 4, pp. 675–680, Apr. 1990.*

Z. Ma, J. Scheinbeim, J. Leo, and B. Newman, "High field electrostrictive response of polymers," Journal of Polymer Scienc Part B: Polymer Physics, vol. 32, pp. 2721–2731, Jun. 1994.*

X Lu et al, "Giant Electrostrictive Response in Poly(Vinylidene Fluoride–Hexafluoropropylene) Copolymers," IEEE Transactions on Ultrasonic, Ferroelectrics, and Frequency Control, vol. 47, No. 6, Nov. 2000.*

* cited by examiner

Primary Examiner—Nestor Ramirez
Assistant Examiner—Peter Medley
(74) Attorney, Agent, or Firm—Henry I. Schanzer; Michael Y. Epstein

(57) ABSTRACT

An electrical energy generator relying upon piezoelectricity includes electrical generating elements comprising electroded bodies of an electrostrictive material, e.g., polyurethane, having inherent but weak piezoelectric characteristics. A d.c. bias is applied between the electrodes for field-inducing a larger piezoelectric characteristic whereby, upon applying mechanical energy to the element, in known manner, for alternately straining and destraining the body, electrical charge is generated on the electrodes with a high mechanical energy to electrical energy conversion efficiency.

4 Claims, 2 Drawing Sheets

FIELD-INDUCED PIEZOELECTRICITY FOR ELECTRICAL POWER GENERATION

This application claims the benefit of U.S. Provisional Application No. 60/045,954, filed May 8, 1997.

BACKGROUND OF THE INVENTION

This invention relates to the generation of electrical power using piezoelectric materials, and particularly to such power generation using field-induced piezoelectricity within electrostrictive materials such as polyurethane.

It is now well known to use piezoelectric materials in various apparatus for the conversion of natural sources of mechanical energy, e.g., surface waves on oceans, directly into electrical power. A characteristic of certain piezoelectric materials is that they are internally permanently poled, i.e., they are "ferroelectric" materials, possessing an intrinsic electric field which can be altered by strainings of the materials and attendant electric charge movement and electrical energy generation.

Presently, a preferred piezoelectric material for many power generating applications is the manufactured polymer, PVDF. As normally made, PVDF is not a piezoelectric material. However, ferroelectric characteristics can be effectively permanently induced therein by heating the material while in a d.c. electric field for causing the electric dipoles of the material to align with the field, and then slowly cooling the material, while still in the field, for "freezing" the dipoles in place.

Aside from being ferroelectric, PVDF has several other characteristics making it particularly suitable for use in electrical power generators. For example, being a plastic-like material, it is relatively inert (thus, safely usable in corrosive, e.g., ocean environments); it is relatively easily strained (for utilizing the available mechanical energy most efficiently for altering the material internal electric field); and it can be repeatedly mechanically strained without loss of desired characteristics. It has other desirable characteristics as well.

Depending upon how the PVDF material is used, calculations and experimental data show that mechanical to electrical energy conversions can have efficiencies as high as 30%. While impressive, room for improvement exists.

The inventors herein are aware of another polymer transducer material; namely, polyurethane. By "transducer" is meant that polyurethane is "electrostrictive" and can be elastically deformed by an externally applied electric field. However, polyurethane and other electrostrictive materials are not ferroelectrics in that they contain no intrinsic internal field and, unlike PVDF, they can not be treated to obtain a permanent poled condition. To the inventors' knowledge, electrostrictive materials have never been considered for use for power generation purposes. One reason, perhaps, relates to earlier uses of ferroelectric materials. Materials such as PVDF have long been used in mechanical energy detectors, e.g., for underwater detection of sound energy. A sound detector made of an electroded sheet of poled PVDF is, without more, a sound energy detector. Varying intensity sound pressures, even of extremely small amplitude, generate corresponding a.c. voltages across the PVDF sheet which are collected by the electrodes for electronic amplification. Familiarity with such signal detecting devices is one reason why PVDF was considered for use in power generating applications.

Conversely, the strain versus electrical charge characteristics of electrostrictive materials are such that they are quite inefficient for use in direct substitution for PVDF type materials in the aforedescribed signal detection applications. Thus, they were never so used, and not later considered for use in power generation applications. Conversely, electrostrictive materials, and polyurethane in particular, have been extensively used in "actuator" applications, i.e., electrically operated transducers for providing precise, small mechanical movements in response to applied electrical control signals.

The herein inventors have experience both with PVDF power generators and with polyurethane actuators. It became evident to them, based upon their evaluations of those parameters of PVDF which contribute to, or detract from, the utility of PVDF as a power generator, that polyurethane has many physical characteristics which at least suggest that polyurethane would be more efficient than PVDF for power generation applications. Both the recognition of the suitability of polyurethane (as well as other electrostrictive materials) for use as a power generator, and the means required to make such use both possible and practical, constitute the present invention.

SUMMARY OF THE INVENTION

For providing a body of an electrostrictive material, e.g., polyurethane, with piezoelectric characteristics, electrodes are provided on spaced apart surfaces of the body, and a d.c. voltage is applied between the electrodes for establishing an electric field through the body. The mechanical energy to electrical energy conversion of such materials (i.e., a parameter known as $d_{31}$) is directly proportional to the bias field. For maximum power conversion efficiency, the d.c. voltage is as high as possible consistent with reliable use of the power generator. Other parameters of electrostrictive materials affecting their suitability for power generation are discussed hereinafter.

DESCRIPTION OF THE DRAWINGS

The drawings are schematic and not to scale.

DESCRIPTION OF PREFERRED EMBODIMENTS OF THE INVENTION

As mentioned, polyurethane, as presently manufactured, is an "electrostrictive" material and is extensively used in "actuator" applications. The inventors herein recognized, as previously noted, that while polyurethane is not a ferroelectric material, it has physical characteristics which indicate that polyurethane would be even better than PVDF as an electrical power generating element.

For example, it is found that polyurethane, in comparison with PVDF, has lower dielectric losses; a lower Young's modulus, thus requiring less mechanical force for straining the material; a higher elastic limit, thus permitting a greater power strain level; a higher ratio of breakdown voltage to operating voltage; and a lower dielectric constant providing more power per unit volume of material.

In general and based upon the experience of the herein inventors, it has been determined that, while the suitability of any piezoelectric material for use as a power generating element is a function of the particular power generating application, a major parameter indicating power generating suitability is the parameter $K_{31}^2$. By definition:

$$K_{31}^2 \equiv d_{31}^2 Y / \in; \quad (1)$$

and $$d_{31} \equiv \Delta Q / \Delta S \quad (2)$$

where $\Delta Q$ is the change of charge density (coulombs/m$^2$) induced in response to a change of stress ($\Delta S$, newtons/m$^2$) of the material (hence, a measure of the piezoelectric characteristic of the material); Y is Young's modulus of elasticity; and $\in$ is dielectric permittivity.

Considering the various parameters included in equations (1) and (2), the parameters Y and E are fixed and dependent upon the particular material. It turns out, however, that $d_{31}$ can be variable in electrostrictive materials. Before discussing this, a basic piezoelectric power generating element is first described.

Figure 1:
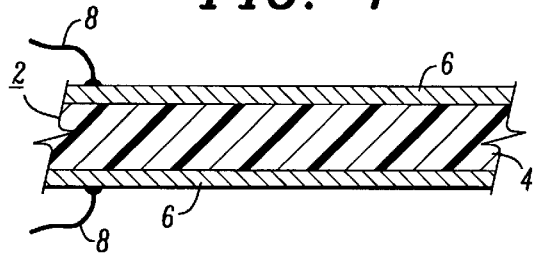
FIG. 1 is a view, in section, of an electroded sheet of polyurethane.

FIG. 1 shows an electroded element 2 for use, in accordance with this invention, for electrical power generation. The element 2 comprises a sheet 4 of the electrostrictive material, polyurethane, and conductive layers 6 on opposite major surfaces of the sheet serving as electrodes. While experiments are continuing for determining preferred parameters, in one successful experiment, the sheet 4 had a thickness of 30 microns, and the electrodes 6 were of gold, having a thickness of 1,000 Å. Terminals 8 are mechanically and electrically connected to the respective electrodes by known means. In a preferred embodiment to be described, a fairly large number of elements are used in stacked relation, whereby the power flow through each element is relatively small.

For operation of the element 2 as an electrical power generator, a d.c. voltage is applied between the two electrodes 6, thus providing a d.c. electric field through the sheet.

Figure 2:
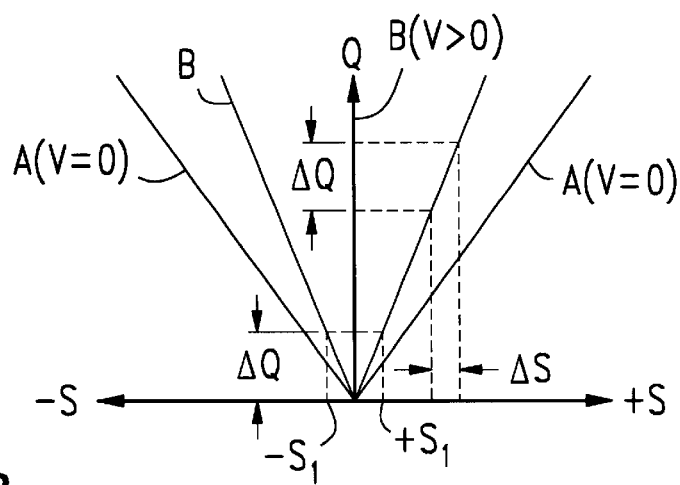
FIG. 2 is a graph plotting relationships between charge density (Q) and stress (S) for the sheet shown in FIG. 1.

The effect of applying a d.c. voltage to the electrodes 6 is illustrated in FIG. 2 which shows the relationship, for electrostrictive materials, of induced electrical charge density (Q), plotted along the vertical axis, against stress (+ or −), plotted along the horizontal axis.

The V-shaped curve marked A shows the relationship present (for + or − stress) when no external d.c. voltage is present. The slope of the curve, $\Delta Q/\Delta S$, is (equation 2) the parameter $d_{31}$. Applying a d.c. voltage across the electrodes 6 of the element causes the curve A to shift to curve B of higher slope and of higher $d_{31}$. The increase of $d_{31}$ is proportional to the applied d.c. bias.

Returning to a consideration of equations 1 and 2, the effect of increasing $d_{31}$ is apparent; it indicates an improvement in the power generating suitability of the material. However, the mere fact that the parameter $d_{31}$ can be increased by application of a d.c. bias is not, by itself, indicative that any material is suitable for use as a power generator. Other factors, such as the parameters Y and $\in$ (from equations 1 and 2) must also be satisfactory.

The essence of the invention is thus that electrostrictive materials having low intrinsic piezoelectricity characteristics can be efficiently used in power generation applications by applying a d.c. bias across the material. Additionally, the material must have other characteristics (such as previously discussed for PVDF and polyurethane, and dependent upon the particular application) for efficient and practical power generating use.

A further example of the significance of the foregoing is as follows:

As previously explained, a presently preferred material for power generation purposes is the ferroelectric material, poled PVDF. The fact that PVDF can be converted to a ferroelectric material by poling is considered essential and, indeed, relevant to the fact that electrostrictive materials, which cannot be permanently poled, have not been considered for power generation purposes. With the present invention, however, entirely new possibilities arise. For example, another ferroelectric material used for power generation is the copolymer PVDF-TrFE. Similarly as the closely related PVDF, PVDF-TrFE can be permanently poled to convert it to a ferroelectric, and it has been used as such for power generation. It has recently been discovered (by a proprietary process not owned by the assignee from the inventors herein) how to make the PVDF-TrFe an electrostrictive material (for use in actuators) rather than a ferroelectric material. However, when the material is operated as an electric field-induced piezoelectric, by the application of a d.c. bias thereacross in accordance with the invention, it is found to be superior for power generation purposes than the same material when permanently poled. This is quite unexpected, and a whole new approach to power generation through field-induced piezoelectricity has now been opened.

A presently preferred electrical power generator 10 is now briefly described in connection with FIG. 3. Although the generator was originally designed for use with PVDF elements, the herein described polyurethane elements can be identically used taking into account only the preferred stress-strain characteristics of polyurethane versus PVDF elements. Details of the preferred generator are described in co-pending U.S. patent application, Ser. No. 08/738,335, filed Oct. 25, 1996, for C. Carroll, and assigned to the assignee of the present invention. The subject matter of the co-pending patent application is incorporated herein by reference.

Figure 3:
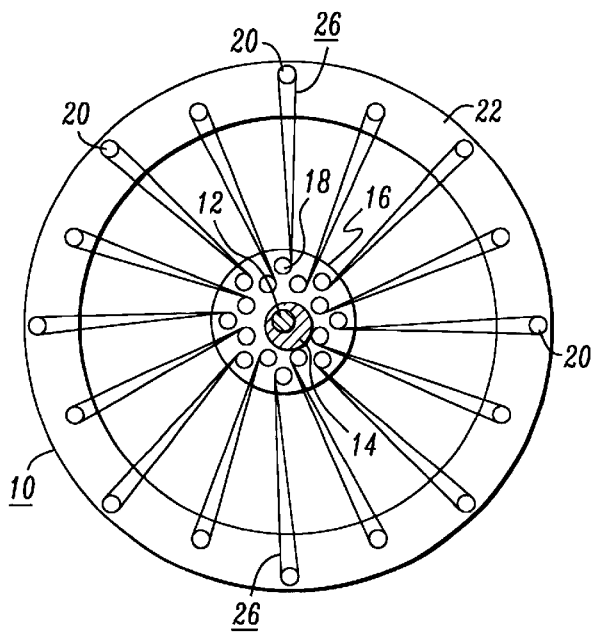
FIG. 3 is an end view of an electrical power generator using power generating polyurethane looped elements.

The generator 10, shown in end view in FIG. 3, comprises a central, circular first shaft 12 which is rotated by a source of mechanical power to be converted to electrical energy. Most simply, the energy source can be a water wheel. Mounted on the first shaft 12 for rotation relative to the shaft 12, e.g., by means of an intermediate bearing (not shown), is a second circular shaft 14 having a central axis which is off-set from the central axis of the first shaft. The second shaft 14 is thus eccentrically driven by the first, rotating shaft. The second shaft is prevented from rotating, by means to be described, whereby the rotation of the first shaft 12 causes the axis of the second shaft 14 to orbit around the first shaft axis, but without rotation of the second shaft around its own axis. (The orbiting motion occurring is readily visualized by holding a quarter in one's fingers and moving the quarter in a circular path solely by movement of the hand. The quarter does not rotate, but it does orbit.)

Rigidly mounted on the second shaft 14 coaxially therewith is a rigid plate 16 which thus also orbits around the axis of the first shaft 12. Mounted between support posts 18 rigidly mounted on the orbiting plate 16 and support posts 20 rigidly mounted on a fixed plate 22 are individual power generating elements 26 each in the form of a loop. For ease of assembly of the apparatus, the elements 26 are disposed in two arrays. In each array, the posts 18 on the orbiting plate 16 are disposed symmetrically around a circle concentric with the axis of the second (orbiting) shaft 14, while the posts 20 on the fixed plate 22 are disposed symmetrically around a circle concentric with the axis of the first (power) shaft 12. On the orbiting plate 16, the circle of posts 18 of a first of the arrays is of smaller diameter than the circle of posts 18 of the second array. On the fixed plate 22, the same relationship obtains. That is, those elements 26 connected to posts 18 of the first array (smaller diameter circle) on the orbiting plate 16 are connected to posts 20 on the fixed plate which are disposed around the smaller diameter circle of the two circles of posts 20 on the fixed plate 22. Thus, all the elements 26 are of identical dimensions.

All the elements are identically driven, but out of phase. Thus, as the orbiting plate 16 orbits around the axis of the first shaft 12, all the posts 18 on the orbiting plate 16 follow small circular paths offset from the axis of the first shaft 12. This causes a constantly varying distance between the ends of the generator elements 26 which are mounted on the orbiting plate posts 18 and the ends of the generator elements which are secured to the fixed plate posts 20. All the generating loops 26 are mounted in place in slightly stretched condition, hence the varying element lengths cyclically increase and then decrease the straining of the elements. Such cyclical straining of the elements causes the generation of electrical power.

Figure 4:
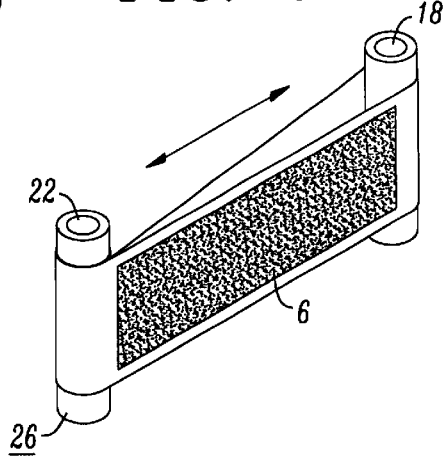
FIG. 4 is a perspective view of one of the elements shown in FIG. 3 and posts between which the element is secured.
Figure 5:
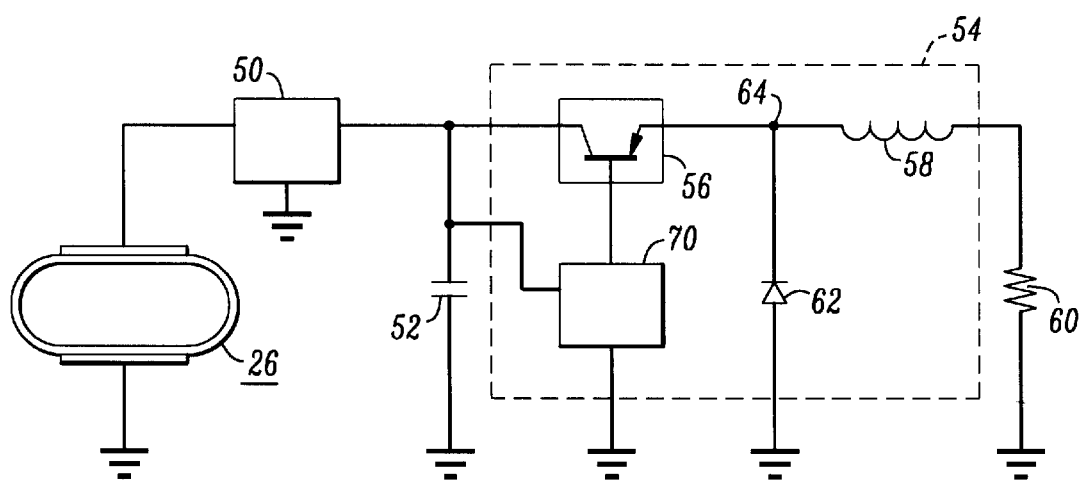
FIG. 5 is a diagram of an electrical system for collecting and using electrical power produced by the generator shown in FIG. 3.

The electrical energy, in the form of ΔQ produced in response to the cyclically varying strain (and corresponding stress, S), is collected from the generating element by known means. For example, as shown in FIG. 5, the two terminals electrically connected to the respective sides of the loop element 26 shown in FIG. 4 are connected, respectively, to an a.c. to d.c. rectifier 50 and to ground. The a.c. power generated by the element 26, in response to the cyclical strainings and destrainings of the element, is thus rectified to d.c. power, and the d.c. output of the rectifier 50 is fed into a storage capacitor 52, one plate of which is connected to ground. The power fed into the capacitor 52 is removed, in small packages of power, by a known type of switching regulator 54 comprising a semiconductor switch 56 feeding power into an inductor 58 which is connected to a load 60 (either for direct consumption of the power, e.g., in a resistive load, or into a battery for storage of the power). A diode 62 is connected between an end 64 of the inductor 58 and ground. Thus, when the switch 56 is in its conductive state, power passes from the power storage capacitor 52 through the inductor 58 and directly into the load 60. The switch is alternately switched between conductive and non-conductive states, and when the switch first starts conducting, allowing for an increasing level of current to flow into and through the inductor 58, energy is stored in the inductor. When the switch 56 is turned-off (thus allowing accumulation of power within the storage capacitor), energy stored in the inductor is returned to the circuit for transfer to the load 60 via a complete current loop including the diode 62 now forward biased.

By controlling the rate of occurrence and duration of the conductive state of the switch 56, the amount of power removed from the storage capacitor 52 can be made equal to the amount of power fed thereto. A control circuit 70 is used for monitoring the power flow and for controlling the switching cycle of the switch 56. The control circuit 70 is responsive to the sensed rate of power flow, e.g., the voltage across the capacitor.

One power generating element 26 and a pair of mounting posts 18 and 20 therefore is shown in FIG. 4. The element is in the form of a loop. The free ends of the loop 26 are secured to the post 20, as by a clamp, not shown, and the bight of the loop is wrapped around the post 18 as to be movable relative thereto. Preferably, each loop (strap) comprises a plurality of individual electroded sheets, such as shown in FIG. 1, laminated together. As indicated in FIG. 4, while all the electrodes on the separate sheets are in overlapped, aligned relationship with one another, the electrodes do not wrap around the posts for avoiding damage to the electrodes. For avoiding the need for electrically insulating the various electrodes from one another, the pairs of electrodes facing towards one another in adjoining sheets are connected electrically in series, whereby the voltages generated by the respective sheets are in additive relationship.

Returning to consideration of FIG. 2, the operation of the generator 10, involving the variable stressing of the elements 2, is indicated as a range of stressing (ΔS) on the curve B corresponding to a ΔQ (proportional to electrical energy being generated). As shown, the stressing range is spaced well away from zero stress because, should the stress reach zero (as determined by the varying distance between the posts 18 and 20), further stressing, i.e., in the opposite direction of stress, is impossible. That is, while the elastic loops can be stretched by increasing the distance between the posts 18 and 20, the elastic loops cannot be squeezed for reverse direction stressing, but simply become limp.

Conversely, if the piezoelectric elements were in the form of rigid, elastic members which can be bent in opposite directions (e.g., a cantilevered beam driven into vibration by a passing power delivering cam), the range of stressing would be from +S to −S as shown.

What is claimed is:

1. A method of generating electrical energy comprising the steps of applying mechanical energy to a body of an electrostrictive material for variable stressing said body, said material having a piezoelectric characteristic, $d_{31}$, defined by:

$$d_{31}=\Delta Q/\Delta S$$

when:

ΔQ is the change of charge density produced in response to a change of stressing of the body; and ΔS is the change of stressing of the body in response to the application of mechanical forces against the body;

applying a d.c. voltage between electrodes on said body during said energy applying step for increasing the value of $d_{31}$ in proportion to the amplitude of the d.c. voltage; and collecting the charge induced by said stressing for conversion into useful electrical power.

2. A method according to claim 1 wherein said material is polyurethane.

3. A method according to claim 1 wherein said material has characteristics allowing conversion of the material from a non-poled condition to a condition of permanent poling, said material being used in said non-poled condition.

4. A method according to claim 3 wherein said material is PVDF-TrFE.

* * * * *